United States Patent
Guthrie et al.

(10) Patent No.: US 10,613,980 B2
(45) Date of Patent: Apr. 7, 2020

(54) COHERENCE PROTOCOL PROVIDING SPECULATIVE COHERENCE RESPONSE TO DIRECTORY PROBE

(71) Applicant: INTERNATIONAL BUSINESS MACHINES CORPORATION, Armonk, NY (US)

(72) Inventors: Guy L. Guthrie, Austin, TX (US); David J. Krolak, Rochester, MN (US); Michael S. Siegel, Raleigh, NC (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/846,392

(22) Filed: Dec. 19, 2017

(65) Prior Publication Data
US 2019/0188138 A1 Jun. 20, 2019

(51) Int. Cl.
*G06F 12/0831* (2016.01)
*G06F 13/16* (2006.01)

(52) U.S. Cl.
CPC ...... *G06F 12/0831* (2013.01); *G06F 13/1663* (2013.01); *G06F 2212/1032* (2013.01); *G06F 2212/507* (2013.01)

(58) Field of Classification Search
CPC ............. G06F 12/0831; G06F 13/1663; G06F 2212/1032; G06F 2212/507
See application file for complete search history.

(56) References Cited

U.S. PATENT DOCUMENTS

| 5,517,648 | A  | * | 5/1996  | Bertone | G06F 12/0831 710/244 |
| 5,598,550 | A  | * | 1/1997  | Shen | G06F 12/0831 711/146 |
| 5,765,208 | A  | * | 6/1998  | Nelson | G06F 9/3834 711/144 |
| 6,338,122 | B1 | * | 1/2002  | Baumgartner | G06F 12/0815 711/100 |
| 8,510,512 | B2 |   | 8/2013  | Ganfield et al. | |
| 2003/0204680 | A1 | * | 10/2003 | Hardage, Jr. | G06F 12/0831 711/146 |

(Continued)

*Primary Examiner* — Larry T Mackall
(74) *Attorney, Agent, or Firm* — Brian F. Russell; Bryan Bortnick

(57) ABSTRACT

A data processing system includes first and second processing nodes and response logic coupled by an interconnect fabric. A first coherence participant in the first processing node is configured to issue a memory access request specifying a target memory block, and a second coherence participant in the second processing node is configured to issue a probe request regarding a memory region tracked in a memory coherence directory. The first coherence participant is configured to, responsive to receiving the probe request after the memory access request and before receiving a systemwide coherence response for the memory access request, detect an address collision between the probe request and the memory access request and, responsive thereto, transmit a speculative coherence response. The response logic is configured to, responsive to the speculative coherence response, provide a systemwide coherence response for the probe request that prevents the probe request from succeeding.

18 Claims, 10 Drawing Sheets

(56) References Cited

U.S. PATENT DOCUMENTS

| | | | |
|---|---|---|---|
| 2006/0174069 A1* | 8/2006 | Shaw | G06F 12/0817 711/146 |
| 2008/0244189 A1* | 10/2008 | Allison | G06F 12/0817 711/141 |
| 2009/0327944 A1* | 12/2009 | Sugure | G06F 17/5022 715/772 |

* cited by examiner

COHERENCE PROTOCOL PROVIDING SPECULATIVE COHERENCE RESPONSE TO DIRECTORY PROBE

BACKGROUND

The present invention relates in general to data processing systems and, in particular, to coherence protocols in multiprocessor data processing systems.

A conventional multiprocessor (MP) computer system, such as a server computer system, includes multiple processing cores all coupled to a system interconnect, which typically comprises one or more address, data and control buses. Coupled to the system interconnect is a system memory, which represents the lowest level of directly addressable memory in the multiprocessor computer system and which generally is accessible for read and write access by all processing units. In order to reduce access latency to instructions and data residing in the system memory, each processing core is typically further supported by a respective multi-level cache hierarchy, the lower level(s) of which may be shared by one or more processor cores.

Because multiple processor cores may request write access to a same cache line of data and because modified cache lines are not immediately synchronized with system memory, an MP computer system typically implements a coherence protocol to ensure at least a minimum level of coherence among the various processor core's "views" of the contents of system memory. In particular, memory coherence requires, at a minimum, that after a processing unit accesses a copy of a memory block and subsequently accesses an updated copy of the memory block, the processing unit cannot again access the old copy of the memory block.

A coherence protocol typically defines a set of cache states stored in association with the cache lines held at each level of the cache hierarchy, as well as a set of coherence messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherence state transition in the cache hierarchy of the requestor and/or the recipients of a memory access request.

The state to which each memory granule (e.g., cache line or sector) is set is dependent upon both a previous state of the data within the cache line and the type of memory access request received from a coherence participant. Accordingly, maintaining memory coherency in the system requires that the coherence participants communicate messages via the system interconnect indicating their intentions to read or write various memory locations. For example, when a processor core desires to write data to a target memory block, the processor core may first inform all coherence participants of its intention to write data to the target memory block and receive permission from all other coherence participants to carry out the write operation. The permission messages indicate that all other cached copies of the contents of the target memory block have been invalidated, thereby guaranteeing that other processor cores will not access a stale locally cached copy of the target memory block.

BRIEF SUMMARY

In general, memory coherence protocols generally permit a coherence participant to assert control over other coherence participants' access to a memory block after the coherence participant has received some level of ownership of the memory block through arbitration performed by either a distributed or centralized point of control. However, as appreciated by the present disclosure, in certain cases, such a restriction can lead to a loss of memory coherence.

In one embodiment, a data processing system includes first and second processing nodes and response logic coupled by an interconnect fabric. A first coherence participant in the first processing node is configured to issue a memory access request specifying a target memory block, and a second coherence participant in the second processing node is configured to issue a probe request regarding a memory region tracked in a memory coherence directory. The first coherence participant is configured to, responsive to receiving the probe request after the memory access request and before receiving a systemwide coherence response for the memory access request, detect an address collision between the probe request and the memory access request and, responsive thereto, transmit a speculative coherence response. The response logic is configured to, responsive to the speculative coherence response, provide a systemwide coherence response for the probe request that prevents the probe request from succeeding.

DETAILED DESCRIPTION

Figure 1A:
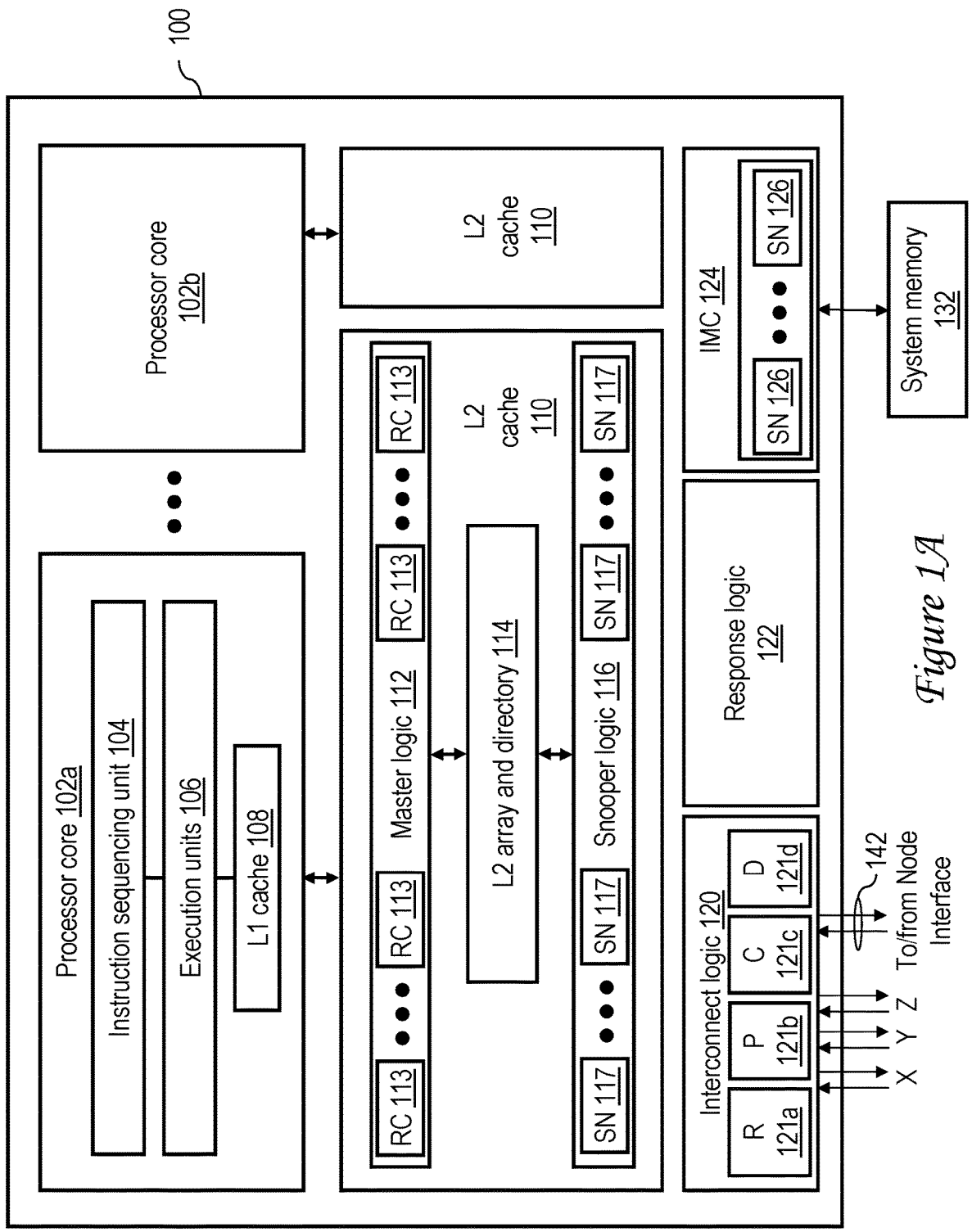
FIG. 1A is a high level block diagram of a processing unit in accordance with one embodiment.

With reference now to the figures and, in particular, with reference to FIG. 1A, there is illustrated a high level block diagram of an exemplary embodiment of a processing unit 100 in accordance with one embodiment. In the depicted embodiment, processing unit 100 is a single integrated circuit including multiple processor cores 102*a*, 102*b* for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102*a*, 102*b* is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102*a*, 102*b* and operations snooped on an interconnect fabric (described below) by snoopers 126.

In the illustrative embodiment, the cache memory hierarchy of processing unit 100 includes a store-through level one (L1) cache 108 within and private to each processor core 102, as well as a dedicated store-in level two (L2) cache 110. L2 cache 110 includes an L2 array and directory 114, master logic 112, and snooper logic 116. Master logic 112 includes multiple read-claim (RC) machines 113 that initiate transactions on the interconnect fabric and access L2 array and directory 114 in response to memory access (and other) requests received from the associated processor core 102. Snooper logic 116 includes multiple snoop (SN) machines 117 that participate in servicing operations received on the interconnect fabric, for example, by provide appropriate coherence responses, performing any access to L2 array and directory 114 required by the snooped operations, and/or supplying a copy of a requested memory block from L2 array and directory 114. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. In some embodiments, at least one lower level (e.g., L3) cache serves as a victim cache and is primarily populated by cache lines evicted from the next higher level (e.g., L2) cache to which it is directly connected.

Figure 1C:
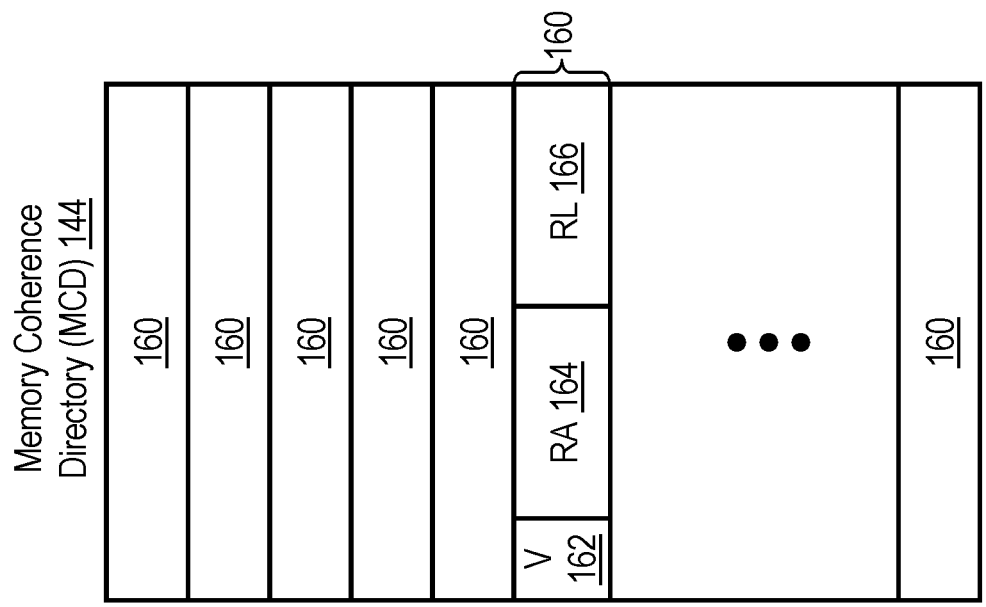
FIG. 1C is a high level block diagram of a memory coherency directory (MCD) in accordance with one embodiment.
Figure 1B:
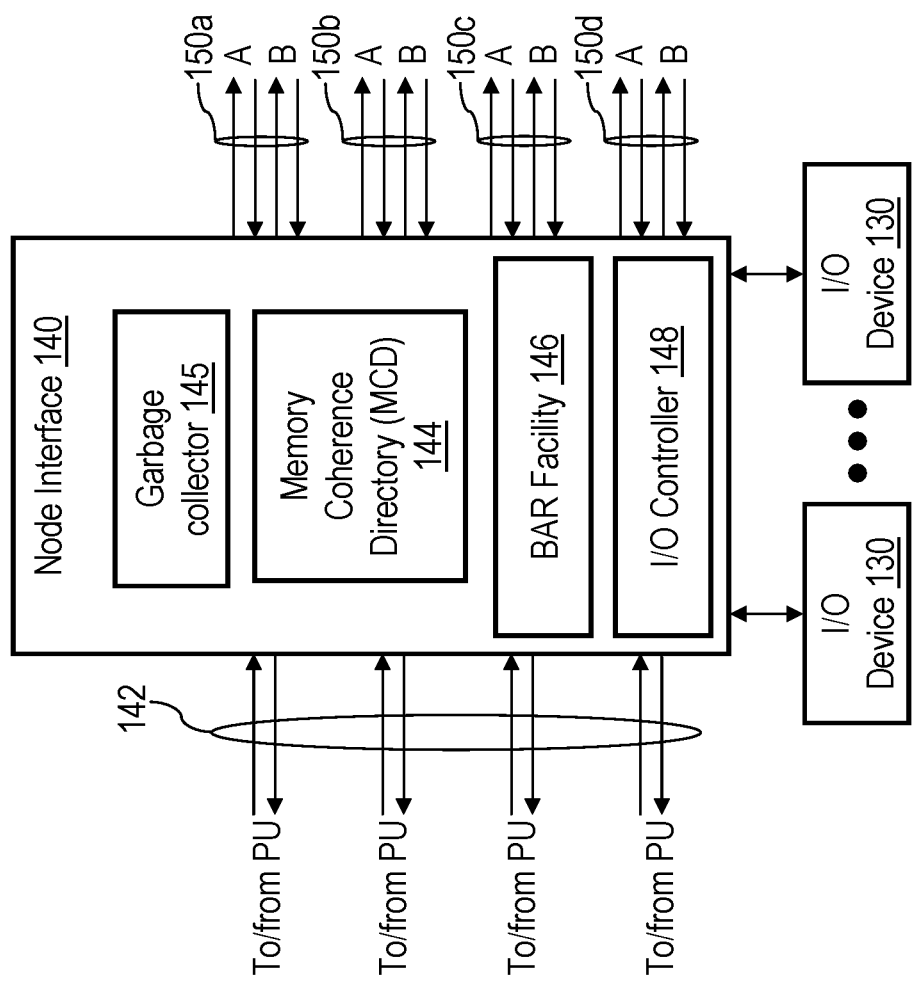
FIG. 1B is a high level block diagram of a node interface in accordance with one embodiment.
Figure 2:
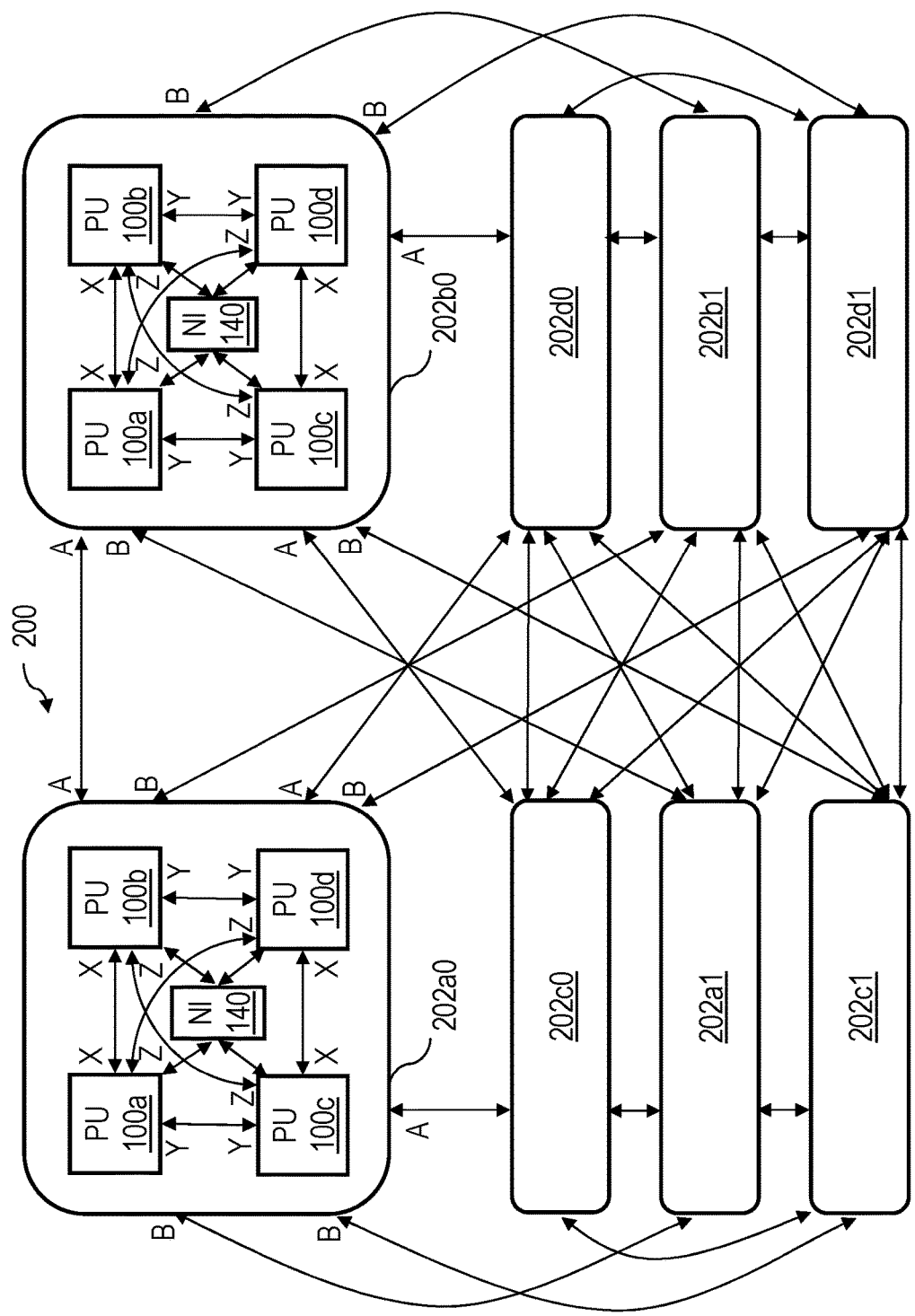
FIG. 2 is a high level block diagram of an exemplary multiprocessor (MP) data processing system in accordance with one embodiment.

As further shown in FIG. 1A, processing unit 100 includes integrated interconnect logic 120 by which processing unit 100 may be coupled to the interconnect fabric as part of a larger data processing system, such as data processing system 200 of FIG. 2. In the depicted embodiment, interconnect logic 120 supports an arbitrary number t1 of "first tier" interconnect links, which in this case include in-bound and out-bound X, Y and Z links to support communication with other processing units 100 in the same processing node. As also shown in FIG. 1A, interconnect logic 120 further supports local interconnect links 142 to a node interface, described further below with reference to FIG. 1B. Interconnect logic 120 includes request logic 121*a*, partial response logic 121*b*, combined response logic 121*c*, and data logic 121*d* for processing and forwarding information during different phases of operations on the interconnect fabric.

In the depicted embodiment, each processing unit 100 further includes an instance of response logic 122. Response logic 122 implements a portion of a distributed coherency signaling mechanism that maintains coherency between the cache hierarchies of processing unit 100 and those of other processing units 100. The operation of response logic 122 is described further below with reference to FIG. 3.

Referring now to FIG. 1B, there is depicted a high level block diagram of an exemplary node interface 140 in accordance with one embodiment. Node interface 140 can be realized as a single integrated circuit chip that supports the interconnection of multiple processing nodes of processing units 100 to form a larger data processing system, such as data processing system 200 of FIG. 2. In the exemplary embodiment, node interface 140 supports local interconnect links 142 for an arbitrary number (in this case, four) of processing units 100 in the local processing node it supports. In addition, node interface 140 supports an arbitrary number of "second tier" interconnect links, which in this case include in-bound and out-bound A and B links 150, to permit communication between processing units 100 in the local processing node and processing units 100 in the other processing nodes. In the exemplary embodiment shown in FIG. 2, each of the processing units 100*a*-100*d* in a local processing node has a respective dedicated set of A and B links 150*a*-150*d* for inter-node communication.

Node interface 140 includes an integrated I/O (input/output) controller 148 supporting the attachment of one or more I/O devices 130. I/O controller 148 may issue DMA read, DMA write, and other requests and receive data on the local interconnect links 142 and/or A and B links 150 in response to commands of I/O devices 130.

Node interface 140 receives and forwards operations between remote processing nodes and processing units 100 in its local processing node. To support enhanced targeting of operations, node interface 140 includes a base address register (BAR) facility 146 indicating the location within a data processing system (e.g., data processing system 200 of FIG. 2) of each range of memory addresses at least by processing node (and preferably by processing unit 100). Node interface 140 further includes a memory coherence directory (MCD) 144, which can be structured in any of a variety of ways.

In one embodiment illustrated in FIG. 1C, MCD 144 includes multiple entries 160 each corresponding to a respective memory region of the real address space that can be mapped to the storage provided by the system memory or system memories 132 in the local processing node. For example, a memory region can correspond to an operating system-defined memory page, a group of memory blocks, or an individually accessible memory block thereof. If desired, MCD 144 can be direct mapped and thus sized to accommodate a respective entry 160 for each memory region of the system memories 132 in the local processing node. Alternatively, MCD 144 can be configured to cache entries 160 corresponding to a small subset of the total number of memory regions of the system memories 132 in the local processing node. In such caching embodiments, each entry 160 may include a valid bit 162, a real address (RA) field 164 identifying the real address of the corresponding memory region of system memory 132, and a remote location (RL) field 166 indicating whether the one or more memory blocks of the memory region identified by RA field 164 is cached other than in the local processing node, and if so, the processing node(s) (or in some embodiments, the processing unit(s)) that cache memory block(s) within the associated memory region.

In a preferred embodiment, node interface 140 manages entries 160 in MCD 144 such that RL fields 166 are set precisely and reset imprecisely. Management of MCD 144 in this manner guarantees coherency while limiting the coherency messages that node interface 140 is required to receive and to process in order to update MCD 144. To aid in updating RL fields 166 of the entries 150 of MCD 144 (and in embodiments in which MCD 144 is not a direct-mapped cache, to aid in replacing unused entries 160), node interface 140 preferably includes a garbage collector 145. In a preferred embodiment, garbage collector 145 periodically "walks" the entries 160 of MCD 144 and issues probe request(s) to the remote processing node(s) identified by RL field 166 as caching one or more memory blocks within the target memory region identified by the associated RA field 164. In response to a probe request, the remote processing node(s) identified by RL field 166 will provide coherence responses indicating whether or not the remote processing node(s) still retain a cached copy of a memory block in the target memory region. Based upon these coherence responses, garbage collector 145 updates RL field 166 to reflect which remote processing node(s) still retain a cached copy of a memory block in the target memory region, thus reducing the scope of broadcast required for future memory access requests of the local processing node that target memory blocks in the target memory region. Garbage collector 145 may also optionally replace entries 160 in MCD 144 for which RL field 166 indicates that no remote processing node caches a copy of any memory block in the associated memory region.

Referring now to FIG. 2, there is depicted a block diagram of an exemplary embodiment of a multiprocessor data processing system 200 formed of multiple processing units 100 in accordance with one embodiment. As shown, the exemplary embodiment of data processing system 200 includes eight processing nodes 202$a$0-202$d$0 and 202$a$1-202$d$1, which in the depicted embodiment, are each realized as a multi-chip module (MCM) comprising a package containing four processing units 100 and a node interface 140. Each processing unit 100 is coupled to each other processing unit 100 in the same processing node 202 for point-to-point communication by the processing units' first tier X, Y, and Z links, as shown. Inter-node point-to-point communication is also supported by coupling the A and B links 150 of the node interfaces 140 of various processing nodes 202. Although illustrated in FIG. 2 with a double-headed arrow, it should be understood that each pair of X, Y, Z, A and B links are preferably (but not necessarily) implemented as two uni-directional links, rather than as a single bi-directional link.

General expressions for forming the topology shown in FIG. 2 can be given as follows:

Node[I][K].chip[J].link[K] connects to Node[J][K].chip [I].link[K], for all I≠J; and Node[I][K].chip[I].link[K] connects to Node[I][not K].chip[I].link[not K]; and Node[I][K].chip[I].link[not K] connects either to:
(1) Nothing if reserved for future expansion; or
(2) Node[extra][not K].chip[I].link[K], in case in which all links are fully utilized (i.e., nine 8-way nodes forming a 72-way system); and
where I and J belong to the set {a, b, c, d} and K belongs to the set {A,B}.

Of course, alternative expressions can be defined to form other functionally equivalent topologies. Moreover, it should be appreciated that the depicted topology is representative but not exhaustive of data processing system topologies and that other topologies are possible. In such alternative topologies, for example, the number of first tier and second tier links of each processing unit 100 can be an arbitrary number, and the number of processing nodes 202 within each tier (i.e., I) need not equal the number of processing units 100 per processing node 100 (i.e., J).

Even though fully connected in the manner shown in FIG. 2, all processing nodes 202 need not communicate each operation to all other processing nodes 202. In particular, as noted above, operations on the interconnect fabric may be broadcast with a scope limited to the local processing node 202 of the master participant that initiates the operation, a scope limited to a processing node 202 other than the local processing node containing the master participant, or with a larger scope, such as a system-wide scope including all processing nodes 202.

Those skilled in the art will appreciate that data processing system 100 can include many additional unillustrated components, such as interconnect bridges, non-volatile storage, ports for connection to networks or attached devices, etc. Because such additional components are not necessary for an understanding of described embodiment, they are not illustrated in FIG. 2 or discussed further herein.

Figure 3:
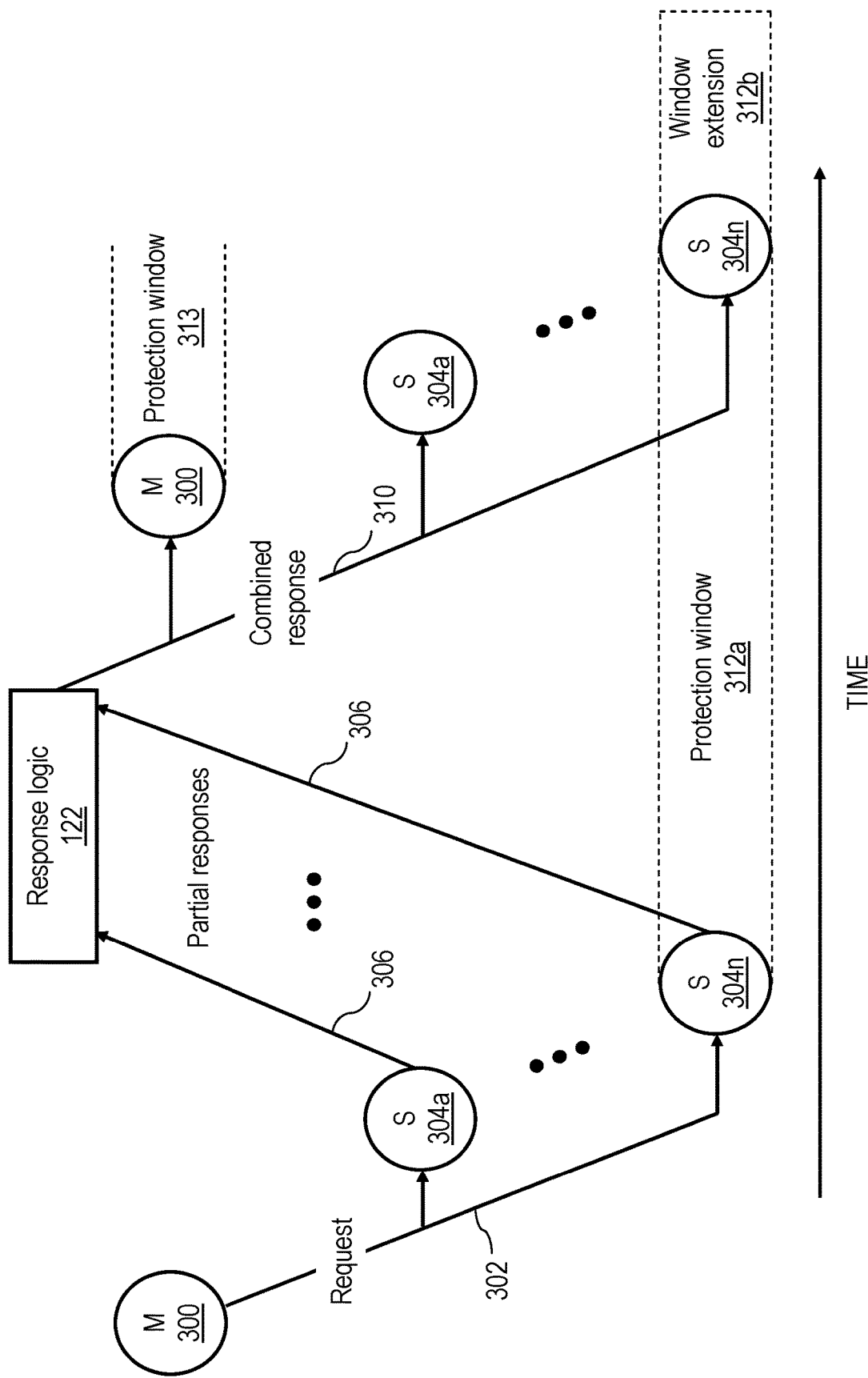
FIG. 3 is a time-space diagram of an exemplary operation including a request phase, a partial response phase and a combined response phase.

Referring now to FIG. 3, there is depicted a time-space diagram of an exemplary operation on the interconnect fabric of data processing system 200 of FIG. 2. Those skilled in the art will appreciate that although a single operation is illustrated in FIG. 3, under typical operating conditions in a multi-node data processing system such as data processing system 200 of FIG. 2, numerous interconnect operations having differing master participants and differing scopes of transmission are concurrently in flight.

The exemplary operation shown in FIG. 3 begins when a master participant 300 (e.g., an RC machine 113 of an L2 cache 110 or an I/O controller 148) issues a request 302 on the interconnect fabric. Request 302 preferably includes at least a transaction type (ttype) indicating a type of desired access, a resource identifier (e.g., real address) indicating a resource to be accessed by the request, and a scope indication indicating a scope of the operation. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by one or more snooping participants 304a-304n within the scope (i.e., extent) of the operation within data processing system 200. Snooping participants 304 include, for example, snoop machines 117 of L2 caches 110, snoopers 126 of IMCs 124, and node interfaces 140. In general, with some exceptions, snoop machines 117 in the same L2 cache 110 as an RC machine 113 that issued a request 302 do not snoop request 302 (i.e., there is generally no self-snooping) because a request 302 of a processing unit 100 is transmitted on the interconnect fabric only if the request 302 cannot be serviced internally by that processing unit 100. Snooping participants 304 that receive and process requests 302 each provide a respective partial response 306 (Presp) (if required by the coherency protocol) representing the response of at least that snooping participant 304 to request 302.

A snooper 126 within an IMC 124 determines the partial response 306 to provide based, for example, upon whether the IMC 124 is responsible for the real address specified by the resource identifier and whether the snooper 126 has resources available to service the request. Similarly, a node interface 140 determines its partial response 306 based upon whether its BAR facility 146 indicates that the resource identifier of request 302 specifies a real address belonging to one of the system memories 132 in its local processing node 202 and whether its MCD 144 indicates that the target memory block is cached in a remote processing node 202. A snooper 116 of an L2 cache 110 may determine its partial response 306 based on, for example, the availability of its L2 cache directory 114, the availability of snoop machine 117 to handle the request, and the coherency state associated with the request address in L2 cache directory 114.

The partial responses 306 of snooping participants 304a-304n are logically combined either in stages or all at once by one or more instances of response logic 122 to determine a combined response (Cresp) 310 representing a system-wide coherence response to request 302. In one preferred embodiment, which will be assumed hereinafter, the instance of response logic 122 responsible for generating combined response 310 is located in the processing node 202 containing the master participant 300 that issued request 302. For example, if an RC machine 113 is the source of request 302, then the instance of response logic 122 responsible for producing combined response 310 can conveniently be the one located in the same processing unit 100 as that RC machine 113. Response logic 122 provides combined response 310 to master participant 300 and the snooping participants 304 via the interconnect fabric to indicate the system-wide coherence response (e.g., success, failure, retry, etc.) to request 302. If combined response 310 indicates success of request 302, combined response 310 may indicate, for example, a data source for a requested memory block, a cache state in which the requested memory block is to be cached by master participant 300, and whether "cleanup" operations invalidating copies of the requested memory block in one or more L2 caches 110 are required.

In response to receipt of combined response 310, one or more of master participant 300 and snooping participants 304 typically perform one or more operations in order to service request 302. These operations may include supplying data to master participant 300, invalidating or otherwise updating the coherency state of data cached in one or more L2 caches 110, performing castout operations, writing back data to a system memory 132, etc. If required by request 302, a requested or target memory block may be transmitted to or from master participant 300 before or after the generation of combined response 310 by response logic 122.

The partial response 306 of a snooping participant 304 to a request 302 and the operations performed by the snooping participant 304 in response to the request 302 and/or its combined response 310 can be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIG. 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIG. 2, the HPC, if any, will be an L2 cache 110. Although other indicators may be utilized to designate an HPC for a memory block, a preferred embodiment designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. As shown in FIG. 3, for a read-type operation, a snooping participant 304n at the HPC (or in the absence of an HPC, the LPC) for the memory block specified by the request address of request 302 protects the transfer of ownership of the requested memory block to master participant 300 during a protection window 312a that extends from the time that snooping participant 304n determines its partial response 306 until snooping participant 304n receives combined response 310 and during a subsequent window extension 312b extending a programmable time beyond receipt by snooping participant 304n of combined response 310. During protection window 312a and window extension 312b, snooping participant 304n protects the transfer of ownership by providing partial responses 306 to other requests specifying the same request address that prevent any other competing master participant from obtaining ownership (e.g., a retry partial response) until ownership has been successfully transferred to master participant 300. Master participant 300 likewise initiates a protection window 313 to protect its coherence ownership of the memory block requested in request 302 following receipt of combined response 310.

Because snooping participants 304 all have limited resources for handling the CPU and I/O requests described above, several different levels of partial responses and corresponding combined responses are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, a snooper logic 116 in an L2 cache 110 may require an available snoop machine 117 and access to L2 cache directory 114 in order to handle a request. Absence of access to either (or both) of these resources results in a partial response (and corresponding combined response) signaling an inability to service the request due to absence of a required resource.

Figure 4:
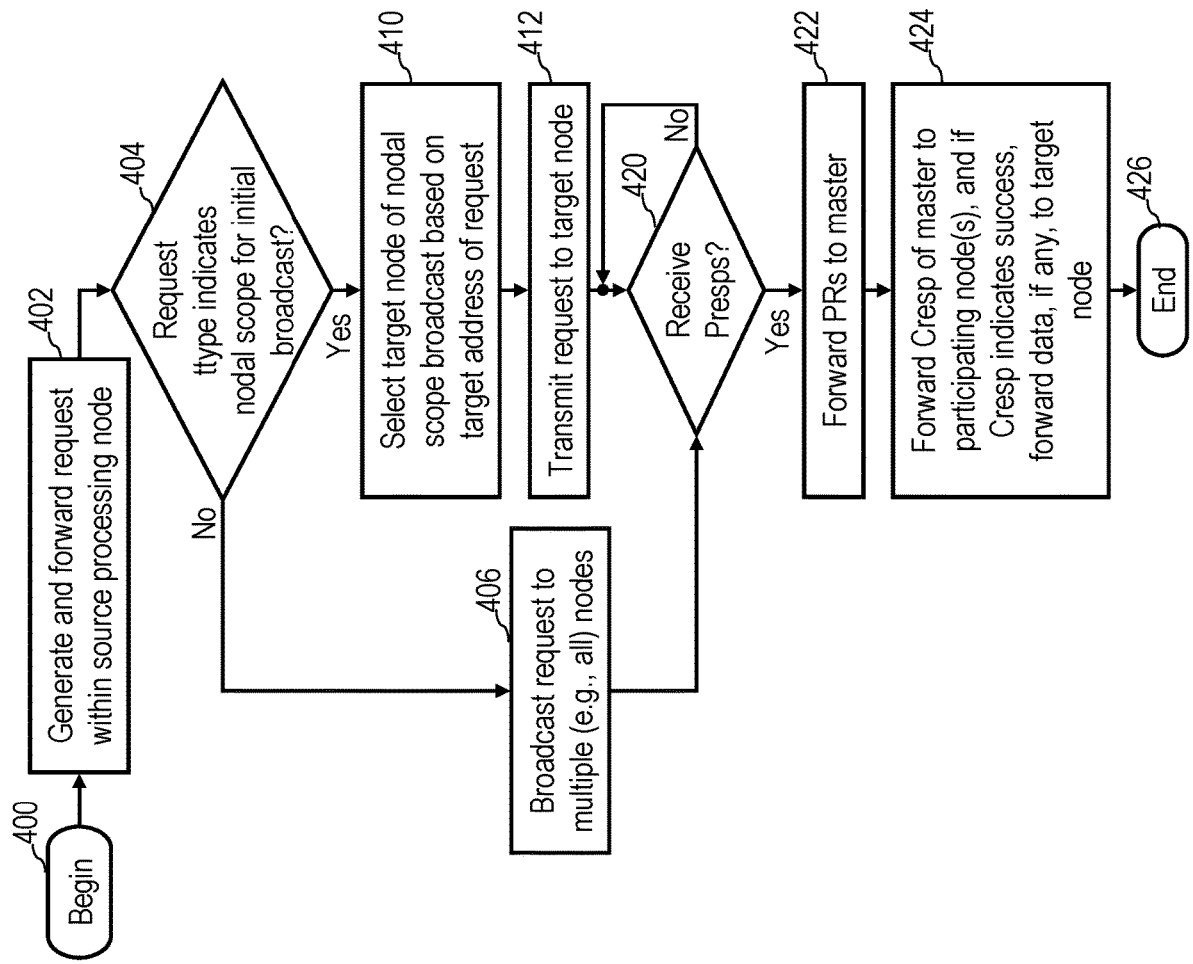
FIG. 4 is a high level logical flowchart of the operation of a node interface of a processing node containing a master initiating a request.

Referring now to FIG. 4, there is illustrated a high level logical flowchart of exemplary process by which a source processing node 202 issues operations of varying scope within data processing system 200 of FIG. 2. As in the other logical flowcharts given herein, logical rather than strictly chronological ordering of steps is illustrated. Consequently, in at least some embodiments, at least some of the illustrated operations can be performed concurrently or in a different order than that illustrated. For ease of reference, in the following description various node interfaces 140 within data processing system 200 are tagged with locational identifiers identifying the processing node 202 to which each belongs. For example, node interface 140a0 refers to the node interface of processing node 202a0, while node interface 140b0 refers to that of processing node 202b0. Processing units 100 are similarly tagged with a node identifier and are additionally tagged with an additional suffix identifying the particular processing unit 100 within the processing node 202. Thus, for example, processing unit 100a0c refers to processing unit 100c of processing node 202a0, while processing unit 100b0a refers to processing unit 100a of processing node 202b0.

The exemplary operation depicted in FIG. 4 has at least three phases as described above with reference to FIG. 3, namely, a request (or address) phase, a partial response (Presp) phase, and a combined response (Cresp) phase. The operation may additionally have a data phase, which may optionally overlap with any of the request, partial response and combined response phases.

The process of FIG. 4 begins at block 400 and then proceeds to block 402, which illustrates a master participant 300 generating and forwarding a request within its processing node 202. The request phase of an I/O request, for example, a DMA write operation, begins in response to receipt by I/O controller 148 of a node interface 140 (hereinafter, assumed to be node interface 140a0 in processing node 202a0) of the DMA write command from an I/O device 130. In response to receipt of the I/O command from the I/O device 130, I/O controller 148 of node interface 140a0 generates and forwards (as appropriate) a DMA write request within its local processing node 202a0. In the exemplary embodiment, because I/O controller 148 is integrated within node interface 140, I/O controller 148 simply forwards the DMA write request to request handling logic within node interface 140 without making the request visible to processing units 100a0a, 100a0b, 100a0c and 100a0d within its processing node 202a0. For non-I/O requests, such as RWITM, DCBZ, DClaim, etc., the master participant 300 (e.g., an RC machine 113 of an L2 cache 110) forwards the request both to node interface 140 and to each of the processing units 100a0a, 100a0b, 100a0c and 100a0d within its (source) processing node 202.

In response to receiving the request, node interface 140a0 determines at block 404 whether the ttype of the request indicates a nodal scope for the initial broadcast of the request. For example, DMA write requests, DCBZ requests and DClaim requests can often be resolved entirely within a home processing node 202 containing the LPC of the target address of the request without making the request visible to (i.e., without transmitting the request to) other processing nodes 202. The ability to resolve such requests within the home processing node 202 is due to the fact that DMA write requests, DCBZ requests, and DClaim requests, while all targeting memory blocks that are cacheable in all processing nodes 202 of data processing system 200, frequently target memory blocks that are cached, if at all, only within the home processing node 202. Consequently, at block 404, node interface 140a0 preferably selects a nodal scope for the initial broadcast of the request if the ttype of the request is a write, DCBZ or DClaim request, and selects either a nodal scope or a more expansive scope (e.g., a system-wide scope including all processing nodes 202) for other types of requests based upon the ttype and/or other factors. For a broadcast of nodal scope, node interface 140a0 further selects the home processing node 202 of the target address of the request as the target processing node 202 of the initial nodal scope broadcast of the request utilizing its BAR facility 146 (block 410).

Node interface 140a0 then transmits an initial broadcast of the request to the processing node(s) 202 within the scope selected at block 404. Thus, if a remote nodal scope is selected for the initial broadcast of the request, node interface 140 transmits the request via the appropriate interconnect link(s) to the home processing node 202 of the target address of the request (block 412). For example, node interface 140a0 may transmit an initial broadcast of a DMA write request of nodal scope from processing node 202a0 via a second tier link A to node interface 140b0 of processing node 202b0 if it is the home processing node 202 of the target address of the request. Of course, if a local nodal scope is selected from the initial broadcast of the request and the home processing node 202 of the target address of the request were processing node 202a0, node interface 140a0 would simply transmit the request via its local interconnects links 142 to processing units 100a0a, 100a0b, 100a0c and 100a0d. Alternatively, if greater than nodal scope is selected for the initial broadcast of the request, node interface 140 broadcasts the request to multiple remote processing nodes 202 (e.g., all processing nodes 202 in data processing system 200) via second tier A and/or B links 150, as depicted at block 406 of FIG. 4.

Following the request phase, the partial response (Presp) phase occurs, as shown at blocks 420-422 of FIG. 4. In the partial response phase, each snooping participant within the scope of the broadcast of the request evaluates the request and, if required by the coherency protocol, provides its partial response to the operation to its respective node interface 140. For example, for a request including processing node 202b0, processing units 100b0a, 100b0b, 100b0c and 100b0d transmit their respective partial responses to node interface 140b0 of processing node 202b0. Node interface 140b0 in turn transmits these partial responses to the node interface 140 of the processing node 202 containing the master participant (e.g., node interface 140a0).

As will be appreciated, the collection of partial responses can be implemented in a number of different ways. For example, it is possible to communicate the individual partial response of each participant in an operation back to the processing node 202 containing the master participant of the request. Alternatively, for greater efficiency, it may be desirable to accumulate partial responses as they are communicated back to the master participant. In order to ensure that the effect of each partial response is accurately communicated back to the processing node 202 containing the master participant of the request, it is preferred that the partial responses be accumulated, if at all, in a non-destructive manner, for example, utilizing a logical OR function and an encoding in which no relevant information is lost when subjected to such a function (e.g., a "one-hot" encoding).

As indicated in FIG. 4, node interface 140a0 awaits receipt of some or all expected partial responses and, in response to receipt of the partial responses, forwards the partial responses to response logic 122 in the processing node 202 containing the master participant that initiated the request (blocks 420 and 422). The response logic 122 within the processing node 202 containing the master participant (e.g., I/O controller 148 for an I/O request or the response logic 122 of a processing unit 100 that originated a request) compiles the partial responses to obtain a combined response representing the system-wide response to the request (even in cases in which the scope is restricted to less than a system-wide scope), as depicted at block 424. The response logic then broadcasts the combined response to all participants in the operation following the same paths of distribution as employed for the request phase.

As further indicated in block 424 of FIG. 4, servicing the operation may require an additional data phase. For example, in a DMA write operation, the new value of the target memory block can be transmitted via the links connecting I/O device 130 to node interface 140a0, node interface 140a0 to node interface 140b0, and node interface 140b0 to processing unit 100b0b. Conversely, if the operation is a read-type operation, such as a read or RWITM operation, a processing unit 100 in a remote processing node 202 may source the requested memory block to a master participant 300 in processing unit 100a0 via a second tier A or B link 150 and local interconnect links 142.

Figure 5A:
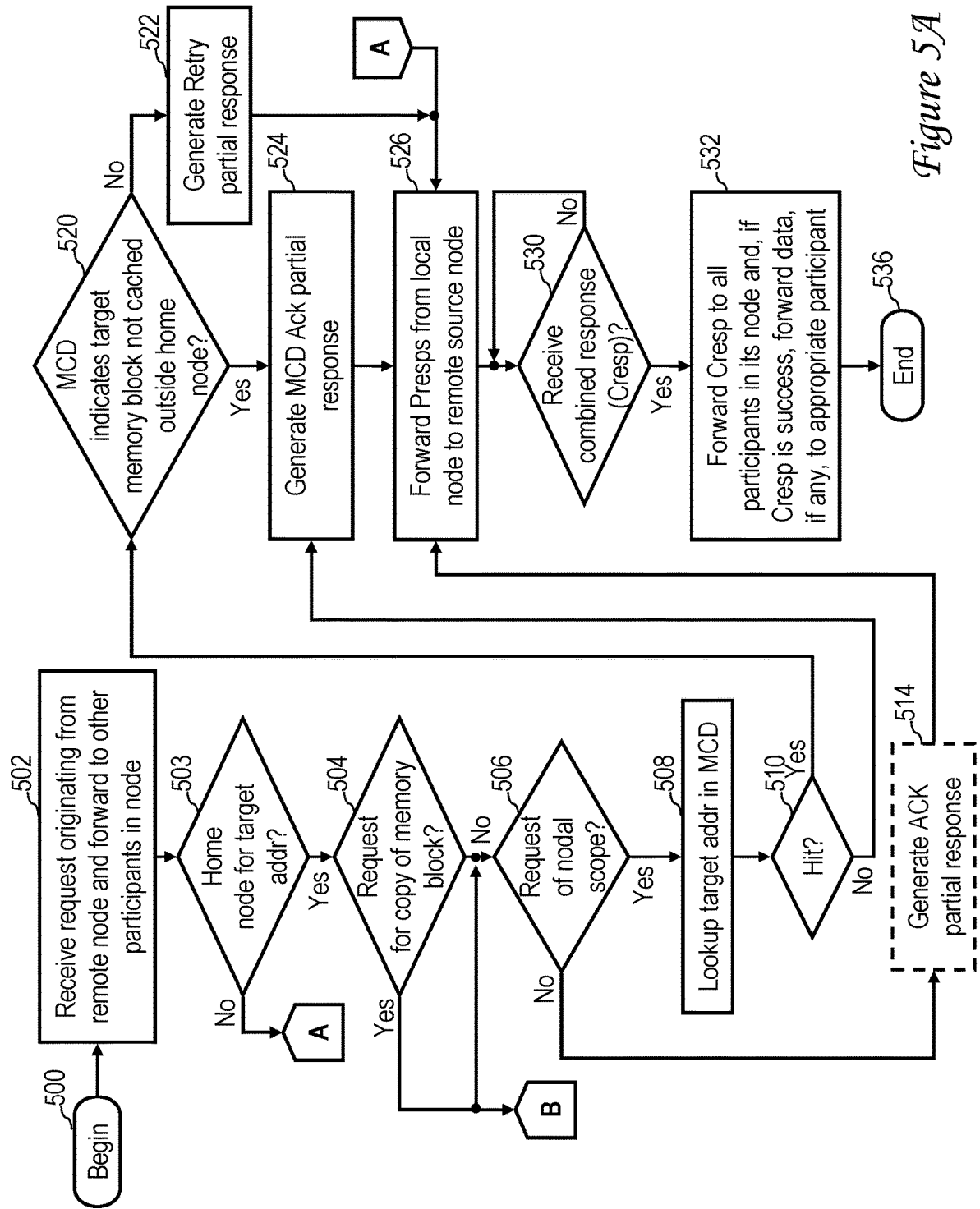
FIGS. 5A-5B together form a high level logical flowchart of the operation of a node interface of a processing node receiving a request sourced by a remote processing node.
Figure 5B:
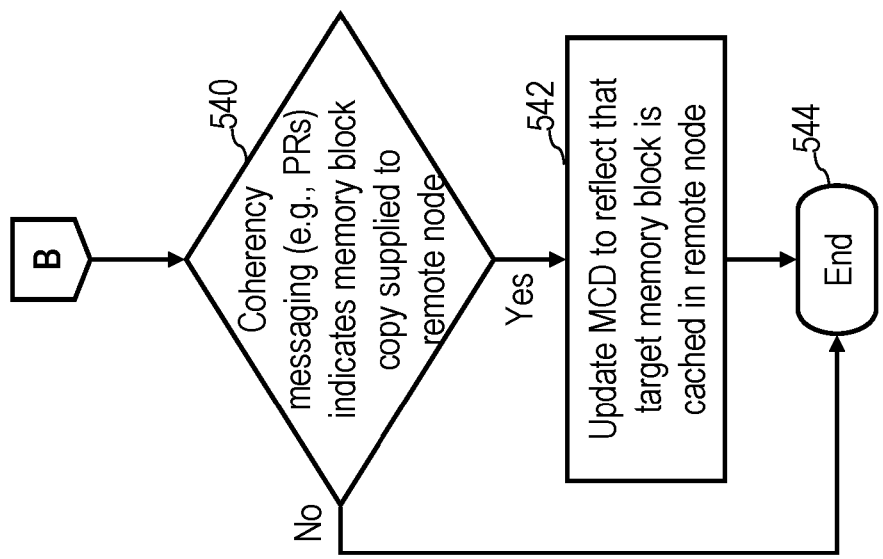

Referring now to FIG. 5A-5B, there is depicted a high level logical flowchart of an exemplary process by which a node interface 140 handles a remotely sourced operation within exemplary data processing system 200 of FIG. 2. The process begins at block 500 and then proceeds to block 502, which illustrates a node interface 140 receiving a request from a remote processing node 202 via one of its second tier A and B links 150.

In response to receipt of the remotely sourced request, node interface 140 determines at block 503 whether or not it is located at the home processing node 202 for the target real address specified by the request. In an exemplary embodiment, node interface 140 makes the home node determination illustrated at block 503 by reference to its BAR facility 146. In response to a determination at block 503 that the node interface 140 is not located at the home processing node 202 of the target address of the request, node interface 140 preferably does not generate an explicit partial response (unless an address collision is detected as described below). The process therefore passes through page connector A to block 526, which is described below. If, on the other hand, node interface 140 determines at block 503 that it is located at the home processing node 202 of the target real address of the request, the process proceeds to block 504. It should be noted that for a request of nodal scope, a negative determination at block 503 is indicative of an error in programming the BAR facility 146 in the source processing node 202 of the request.

Block 504 depicts node interface 140 determining by reference to the request ttype whether or not the request is a request to cache a copy of a target memory block, for example, a Read or RWITM request. If not, the process proceeds directly from block 504 to block 506. If, however, node interface 140 determines at block 504 that the request is a request to cache a copy of the target memory block, the process forks and passes from block 504 to block 506 as well as through page connector B to block 540 of FIG. 5B, which is described further below. At block 506, node interface 140 determines whether or not the request is of nodal scope. In an exemplary embodiment, node interface 140 makes the determination of the request scope by reference to the scope indication contained within the request. In response to a negative determination at bock 506, the process passes to block 514, which illustrates node interface 140 generating an acknowledge (ACK) partial response, if required or permitted by the coherency protocol, to indicate that node interface 140 has received the request and will permit the request to proceed without enforcing a retry. As indicated by dashed line illustration, in some coherency protocols, node interface 140 does not generate an explicit partial response or instead generates a Null partial response. Following block 514, the process proceeds to block 526, which is described below.

If node interface 140 determines at block 506 that the remotely sourced request is of nodal scope, node interface 140 performs a lookup of the target address of the request in its MCD 144 (block 508). As indicated at block 510, if the target address of the request misses in MCD 144, meaning that the target memory block identified by the target address is cached, if at all, only within the home processing node 202, the process passes to block 524, which is described below. If, on the other hand, the target address of the request hits a valid entry 160 in MCD 144, node interface 144 also determines at block 520 whether or not the RL field 166 of the matching entry 160 in MCD 144 indicates that the target memory block is cached, if at all, only within the home processing node 202. If not, node interface 140 generates a Retry partial response, which ultimately prevents the remotely sourced request of nodal scope from completing successfully and forces the master participant to reissue the request with a more expansive (e.g., system-wide) scope. Following block 522, the process proceeds to block 526, which is described below. Returning to block 520, in response to a determination that MCD 144 indicates that the target memory block is cached, if at all, only within the home processing node 202, node interface 140 generates an MCD Acknowledge (Ack) partial response indicating that node interface 140 will permit the remotely sourced request of nodal scope to proceed without retry (block 524). The process then passes to block 526.

At block 526, node interface 140 transmits its partial response, if any, and the partial responses of processing units 100 in its processing node 202 to the remote processing node 202 that sourced the request. Following the partial response phase, node interface 140 then awaits receipt of the combined response, as depicted at block 530 of FIG. 5A. In response to receipt of the combined response, node interface 140 forwards the combined response to all participants (e.g., processing units 100 and I/O controller 148) in the operation in its processing node 202 (block 532). For example, node interface 140b0 of processing node 202b forwards the combined response of a remotely sourced request of nodal scope to the processing units 100b0a, 100b0b, 100b0c, and 100b0d in home processing node 202b0 via local interconnect links 142. Depending on the ttype of the request, if the combined response indicates success, node interface 140 may also forward data to the appropriate participant in order to service the request (block 532). Node interface 140 is preferably capable of specifically targeting data delivery in this manner by reference to its BAR facility 146. Following block 532, the process depicted in FIG. 5A ends at block 536.

Referring now to FIG. 5B, if a request received by node interface 140 is a remotely sourced request for a cacheable copy of a memory block, node interface 140 determines at block 540 whether or not the coherency messaging for the request, for example, the partial responses and/or the combined response, indicates that a cacheable copy of the memory block is to be supplied by the home processing node 202 to a remote processing node 202. If not, the process depicted in FIG. 5B ends at block 544. If, on the other hand, node interface 140 determines at block 540 that the coherency messaging for the request indicates that a cacheable copy of the memory block is to be supplied by the home processing node 202 to a remote processing node 202, node interface 140 updates MCD 144 to reflect that the target memory block is cached in a remote processing node 202 (block 542).

As will be appreciated, the update to MCD 144 depicted at block 542 may entail selection and eviction of a victim entry in MCD 144, for example, by locating an entry 160 marked as invalid in its valid field 162 or by utilizing a least recently used (LRU) or other replacement policy. In an exemplary embodiment, eviction of a valid victim entry from MCD 144 preferably entails flushing any remaining remotely cached copies of memory blocks corresponding to the victim entry so that the record maintained by MCD 144 of which memory blocks are remotely cached is precise.

In a data processing system 200 as has been described, the garbage collection operations performed by garbage collector 145 may collide with requests of master participants. For example, garbage collector 145 may issue one or more probe requests targeting memory blocks within a memory region while a memory access request to a memory block within the memory region is still pending. If not handled correctly, such collisions could lead to a remote processing node retaining a cached copy of the memory block and the MCD 144 of the home processing node 202 being updated incorrectly to reflect that no memory blocks in the target memory region are cached in the remote processing node 202. As will be appreciated, such an erroneous update could lead to a subsequent memory access request targeting the memory region to incorrectly omit the remote processing node 202 from its broadcast scope, leading to a loss of coherency for addresses in the memory region.

In MP data processing systems in which all operations can be guaranteed to complete within a bounded time determined by the longest path in the system topology, this type of coherency problem can be prevented by garbage collector 145 simply selecting a memory region to probe in advance of issuing a probe request and waiting for at least the bounded time prior to issuing the probe request. During this pre-probe waiting period, node interface 140 provides a retry partial response to any memory access requests targeting the selected memory region, thus guaranteeing that no conflicting operation will be in flight when the probe request is issued at the end of the pre-probe waiting period.

However, in many state-of-the-art MP data processing systems, the assumption that all interconnect operations can be guaranteed to complete within a bounded time no longer holds. One reason for this change is the dramatic increase in the transmission frequencies of the various communications links within the MP data processing systems. As link frequencies have increased, transient transmission errors have likewise increased, leading to a shift away from the use of error correcting codes (ECC) to the use of cyclic redundancy codes (CRC) to validate data transmissions. With CRCs, the sender of a data transmission that is determined via CRC to be corrupted resends (i.e., "replays") the data transmission to one or more recipients until the data transmission is correctly received by all recipients. Due to such replays of one or more phases of an operation, operations can no longer be guaranteed to complete within a bounded time. Consequently, in these state-of-the-art MP data processing systems, coherency in the presence of collisions between probe requests and other memory access requests can no longer be maintained, as before, by a node interface observing a pre-probe waiting period prior to issuing probe requests.

In accordance with one aspect of the present disclosure, a collision between a probe request of a node interface and the memory access request of a competing coherence participant in a remote processing node is instead resolved by the competing coherence participant providing a speculative coherence message in response to the probe request. The speculative coherence message is indicative of a possible future interest in a memory block within the target memory region of the probe request that may not yet have been awarded to the competing coherence participant by the coherence arbitration process. Based on the speculative coherence response, the node interface retains or places in the MCD an indication that one or more memory blocks of the memory region are cached at the remote processing node containing the competing coherence participant.

Figure 6:
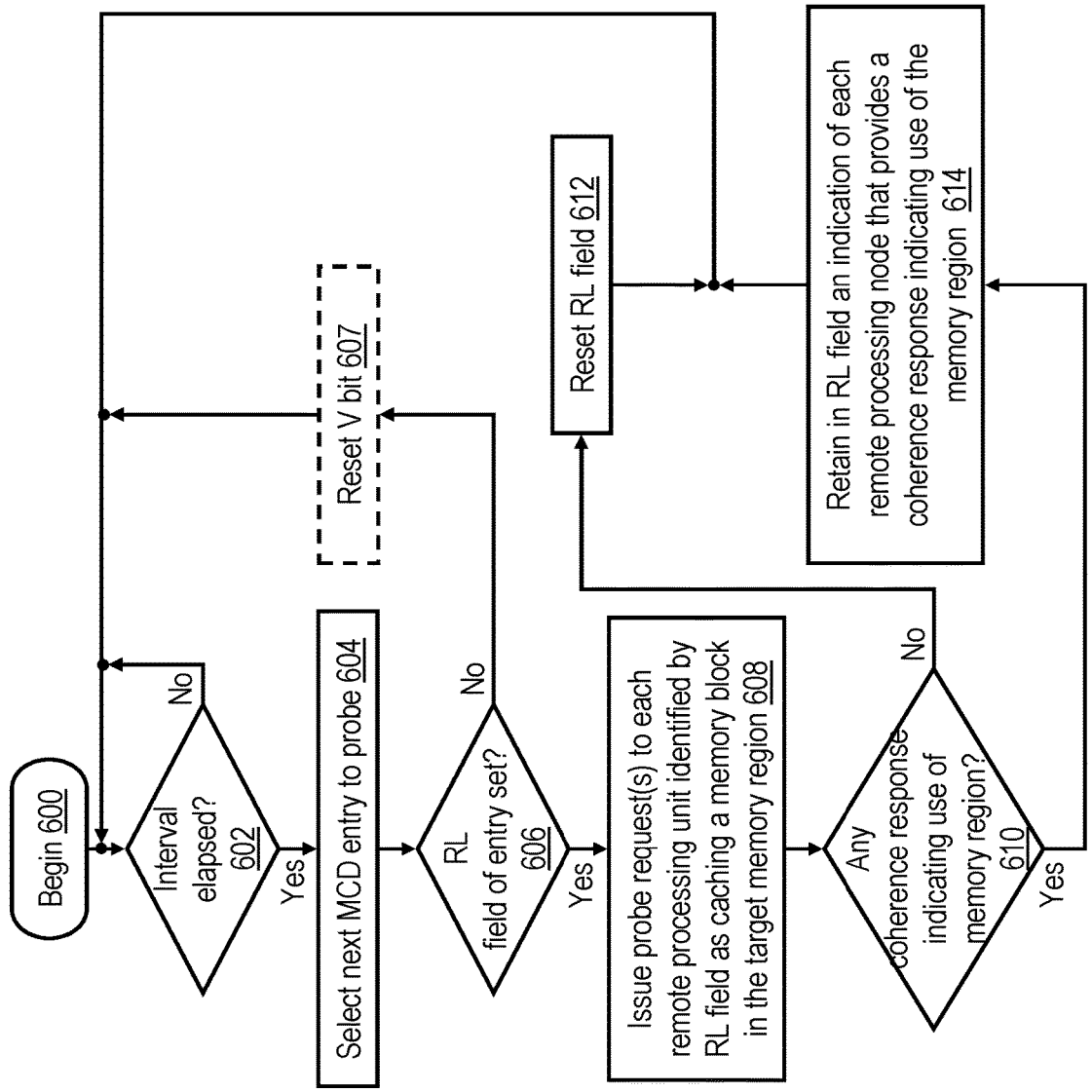
FIG. 6 is a high level logical flowchart of an exemplary method by which a node interface performs garbage collection in a memory coherence directory in accordance with one embodiment.

With reference now to FIG. 6, there is depicted a high level logical flowchart of an exemplary method by which a node interface 140 performs garbage collection for a MCD 144 in accordance with one embodiment. The process begins at block 600 and then proceeds to block 602, which depicts node interface 140, and particularly, the garbage collector 145 of the node interface 140, determining if a garbage collection interval has elapsed. If not, the process iterates at block 602; if, however, garbage collector 145 determines at block 602 that the garbage collection interval has elapsed, the process proceeds to block 604.

Block 604 depicts garbage collector 145 selecting a next entry 160 of MCD 144 to probe in order to determine if all memory blocks within the memory region tracked by that entry 160 are cached, if at all, within the local processing node 202 (and the entry 160 is therefore eligible for replacement from MCD 144). In various embodiments, the selection made at block 604 can be made based on one or more criteria, including the location within MCD 144 of the immediately previously probed entry 160, the real addresses indicated by real address fields 164 of the entries 160, and the number of remote processing nodes indicated by the RL fields 166 of the various entries 160. If at block 606 garbage collector 145 determines that the RL field 166 of the selected entry 160 indicates that no memory block in the memory region associated with the selected entry 160 is cached at a remote processing node 202, garbage collector 145 optionally resets the valid bit 162 of the selected entry 160 (block 607), facilitating the replacement of the selected entry 160 in response to a subsequent miss in MCD 144. Thereafter, the process returns to block 602, which has been described.

In response to a determination at block 606 that the RL field 166 of the selected entry 160 indicates that that one or more memory blocks in the memory region associated with the selected entry 160 are cached by one or more remote processing nodes 202, garbage collector 145 causes the node interface 140 to issue, via the appropriate A and/or B links, one or more probe requests to each of the remote processing nodes 202 identified in RL field 166 as caching memory block(s) in the associated memory region. For example, in some embodiments, node interface 140 may issue a respective probe request for each memory block within the memory region. These probe requests are received by the node interface 140 of the remote processing nodes 202 and distributed to each of the caching participants (e.g., processing units 100) in the remote processing nodes 202 targeted by the probe requests.

At block 610, node interface 140 monitors for return, from the remote processing unit(s) 202, of the coherence responses (e.g., combined responses) for the probe request (s) transmitted at block 608. If the coherence responses indicate that any memory block in the associated memory region is being used in the remote processing node(s) 202 to which the probe request(s) were transmitted, node interface 140 retains in RL field 166 of the selected entry 160 an indication of (e.g., a set bit for) each remote processing node that provides a coherence response indicating use of one or more blocks of the associated memory region (block 614). Other bits within RL field 166 can be reset. If, on the other hand, node interface 140 receives coherence responses indicating that no memory block in the associated memory region is being used by a remote processing node 202, then node interface 140 resets RL field 612, indicating that no memory block in the associated memory region is cached in a remote processing node 202 (block 612). Following either block 612 or block 614, the process depicted in FIG. 6 returns to block 602, which has been described.

Figure 7:
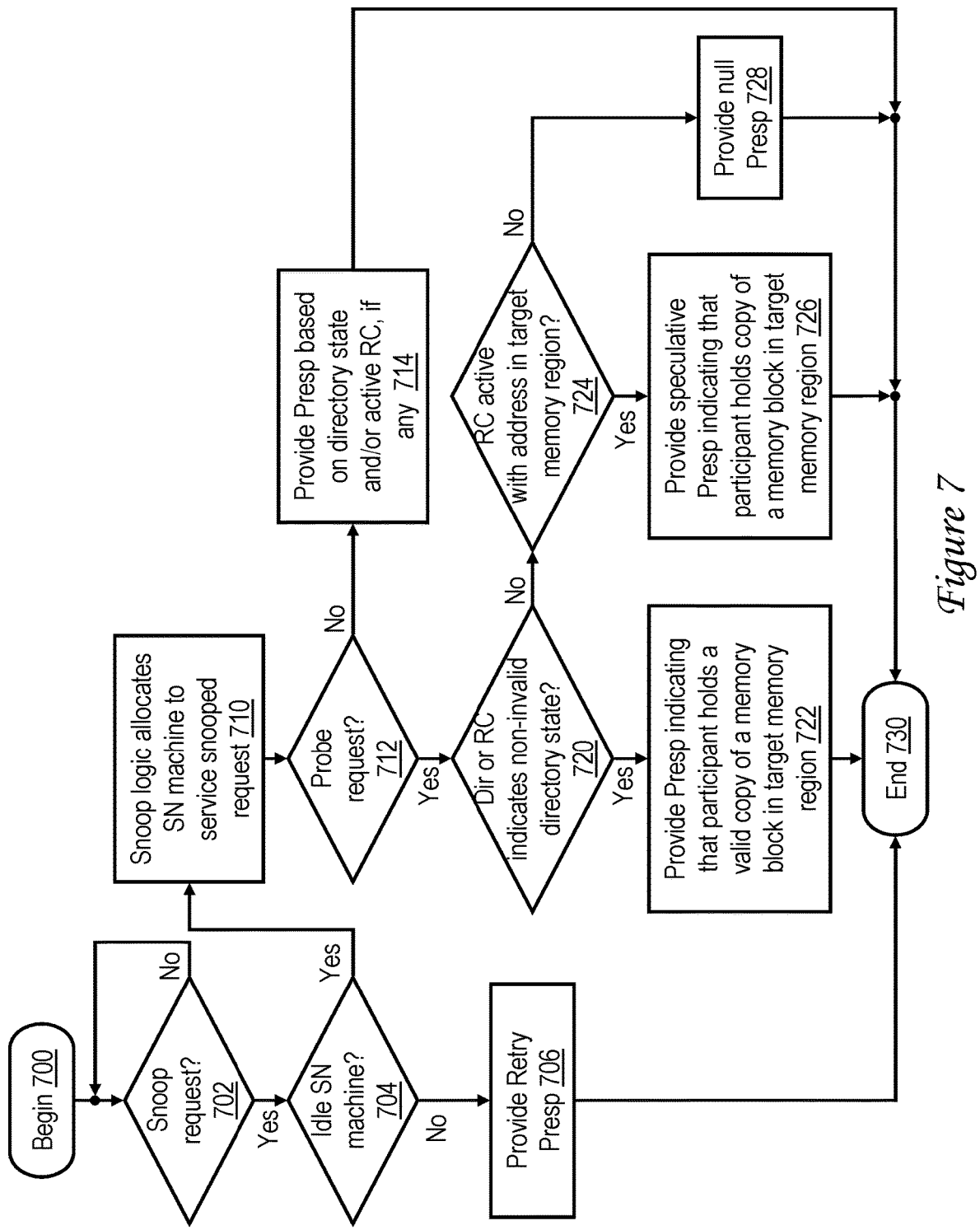
FIG. 7 is a high level logical flowchart of an exemplary method by which snooper logic within a coherence participant determines a partial response for a snooped request on the interconnect fabric in accordance with one embodiment.

With reference now to FIG. 7, there is illustrated a high level logical flowchart of an exemplary method by which snooper logic within a coherence participant determines a partial response for a snooped request in accordance with one embodiment. The process shown in FIG. 7 begins at block 700 and then proceeds to block 702, which depicts snooper logic of a coherence participant (which is hereinafter assumed to be snooper logic 116 of an L2 cache 110 for ease of explanation) awaiting receipt of a request via the interconnect fabric of data processing system 200. In response to snooping a request on the interconnect fabric, snooper logic 116 determines if it has an idle SN machine 117 available to allocate to servicing the snooped request (block 704). If not, snooper logic 116 provides a Retry partial response (Presp) in response to the snooped request (block 706). The Retry partial response will cause a Retry combined response to be generated and the probe request to fail. If the snooped request is a probe request, the Retry combined response will ensure that no update to the RL field 166 of the selected entry 160 of MCD 144 will be made in response to the probe request. Following block 706, the process of FIG. 7 ends at block 730.

Returning to block 704, in response to snooper logic 116 determining that at least one of its SN machines 117 is currently idle and therefore available to service the snooped request, snooper logic 116 allocates the idle SN machine 117 to service the snooped request (block 710). The allocated SN machine 117 determines at block 712 if the snooped request is a probe request of a garbage collector 145, for example, by examining the ttype of the request. If not, SN machine 117 determines and issues a partial response based on, for example, the coherence state indicated for the target memory block of the request by L2 array and directory 114 and/or the presence of an RC machine 113, if any, active servicing a request targeting the same target memory block (block 714). Following block 714, the process of FIG. 7 ends at block 730.

Returning to block 712, in response to determining that the snooped request is probe request, SN machine 117 determines at block 720 whether or not L2 array and directory 114 and/or an RC machine 113, if any, that is active servicing a request targeting the same target memory block indicates a coherence state other than invalid for the target memory block of the probe request. For a RC machine 113 to indicate a coherence state, the RC machine 113 must have received a coherence message (e.g., a combined response) indicating that the RC machine 113 has been awarded at least a read-only copy of the target memory block by the coherence protocol. For example, assuming a MESI (or similar) coherence protocol, SN machine 117 determines at block 720 whether L2 directory 114 or an RC machine 113 associates the address of the target memory block with any of the Modified, Shared, or Exclusive coherence states. If so, the process passes to block 722, which illustrates SN machine 117 providing a partial response indicating that a coherence participant holds a valid copy of a memory block in the target memory region of the probe request. As a result, the node interface 140 that issued the probe request will not update the information in RL field 166 pertaining to the remote processing node containing the SN machine 117, as discussed above with reference to block 614 of FIG. 6. Following block 722, the process of FIG. 7 ends at block 730.

Referring again to block 720, if SN machine 117 determines that L2 directory 114 and RC machines 113 do not indicate a coherence state other than invalid for the target memory block of the probe request, SN machine 117 also determines at block 724 if a local RC machine 113 is nevertheless active with a request targeting a memory address in the target memory region. If not, SN machine 117 optionally provides a null partial response (block 728), but in some embodiments may omit providing a partial response. If, however, SN machine 117 determines at block 724 that a local RC machine 113 is active with a request targeting a memory address in the target memory region, the process proceeds to block 726. Block 726 depicts SN machine 117 providing a speculative partial response indicating that the coherence participant (e.g., L2 cache 110) has requested and may be awarded at least authority to obtain a read-only copy of a memory block in the target memory region. For example, the partial response may speculatively indicate that the coherence participant holds a shared copy of target memory block, regardless of whether or not the coherence participant holds a valid copy of the target memory block. As will be appreciated, this speculative partial response will cause response logic to generate a speculative combined response indicating that a coherence participant in the remote processing node containing SN machine 117 has at least the authority to obtain a read-only copy of a memory block in the target memory region. As a result, the node interface 140 that issued the probe request will not update the information in RL field 166 pertaining to the remote processing node containing the SN machine 117, as discussed above with reference to block 614 of FIG. 6. Following block 726, the process of FIG. 7 ends at block 730.

Figure 8:
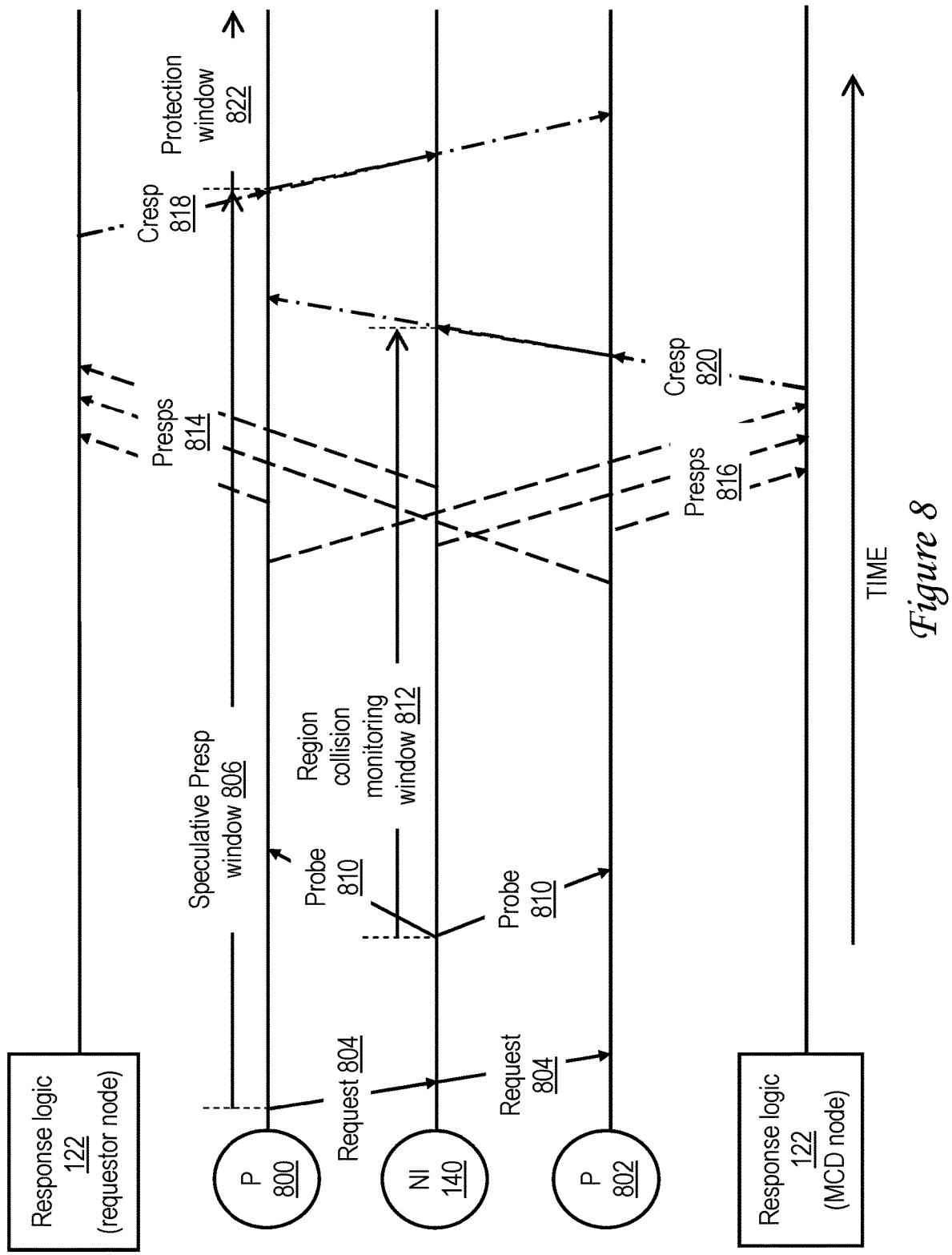
FIG. 8 is a time-space diagram of an exemplary operating scenario in which a coherence participant provides a speculative coherence message in response to a probe request of a node interface.

Referring now to FIG. 8, there is depicted a time-space diagram of an exemplary operating scenario in which a coherence participant provides a speculative coherence message in response to a probe request of a node interface. For ease of understanding, the operating scenario is described with reference to data processing system 200 of FIG. 2 and the processes given in FIGS. 4, 5A-5B, 6, 7, and 8.

As the illustrated process begins, a coherence participant 800 (e.g., an L2 cache 110) initiates a memory access operation on the interconnect fabric of data processing system 200 by issuing a memory access request 804 in accordance with the process given in FIG. 4. The request is transmitted to and distributed within one or more remote processing nodes 202 as described above with reference to FIGS. 5A-5B. As a result, memory access request 804, which includes, for example, at least a ttype, a target real address of a target memory block to be accessed by the request, and a scope indicator, is received (snooped) by multiple other coherence participants in data processing system 200, including a coherence participant 802 and a node interface 140 disposed in a different processing node 202 than coherence participant 800. As shown, the determination of coherence participant 800 to issue memory access request 800 (which may coincide, for example, with the allocation of an RC machine 113 to service the request) initiates a speculative Presp window 806 in which coherence participant 800 will issue a speculative coherence message (e.g., partial response) in response to snooping a node interface probe request that has an conflicting target address, as described above with reference to block 726 of FIG. 7. It should be understood that coherence participant 800 preferably does not provide any partial response to regular memory access requests of processing units 100 during speculative Presp window 806. Speculative Presp window 806 closes in response to receipt by coherence participant 800 of the combined response of request 804.

Following issuance of request 804, node interface 140, which as noted above resides in a different processing node 202 from coherence participant 800, issues a probe request 810 targeting the same target memory block as request 804, as described above with respect to block 608. Issuance of probe request 810 initiates a region collision monitoring window 812. During region collision monitoring window 812, node interface 140 provides a retry partial response to any conflicting memory access request targeting the same memory block as probe request 810, thus preventing the conflicting memory access request from succeeding in obtaining coherence ownership of the target memory block. It should be noted that because request 804 of coherence participant 800 precedes region collision monitoring window 812, node interface 140 does not provide a retry partial response to memory access request 804, but instead provides a partial response 814 for request 804 indicating that memory access request 804 can proceed. Consequently, when all of partial responses 814 of request 804 are processed by an instance of response logic 122, response logic 122 determines a combined response 818 that awards at least read-only coherence ownership of the target memory block to coherence participant 800. In response to receipt of combined response 818, coherence participant 800 initiates a protection window in which coherence participant 800 protects its coherence ownership of the target memory block by providing a retry partial response to any conflicting request.

As shown, because the communication of each of the phases of interconnect operations on the links of the interconnect fabric is not time bounded and may be delayed for an a priori indeterminate time, for example, due to CRC replays, the partial responses 816 for probe request 810 of node interface 140 may be received by an instance of response logic 122 (and the corresponding combined response 820 may be distributed to coherence participants 800 and 802) in advance of those of the prior memory access request 804. Because of this potential variability in the relative timing of the two operations, if coherence participant 800 waited until the beginning of protection window 822 to begin protecting its potential interest in the target memory block of request 804 (and thus fail to provide a partial response 816 signifying its interest in the target memory block), node interface 140 could erroneously update its MCD 144 to indicate that no memory block in the memory region containing the target memory block is cached in the processing node 202 containing coherence participant 800. As a result, memory coherence can be lost.

To eliminate this potential loss of coherence, coherence participant 800 provides a speculative partial response 816 to probe request 810 indicating that coherence participant 800 holds a copy of a memory block in the target memory region, as described above with reference to block 726 of FIG. 7. As a result, the combined response 820 of the probe request 810 will indicate failure of probe request 810, and no update to the relevant bits of RL filed 166 will be made, as discussed above with reference to block 614 of FIG. 6. It should be appreciated that in the event the speculative partial response 816 provided by coherence participant 800 turns out to be incorrect (i.e., combined response 818 does not confer any coherence ownership of the target cache line of memory access request 804 to coherence participant 800), no loss of coherence occurs. Instead, the replacement of the entry 160 in the MCD 144 of node interface 140 is merely delayed.

As has been described, a data processing system includes first and second processing nodes and response logic coupled by an interconnect fabric. A first coherence participant in the first processing node is configured to issue a memory access request specifying a target memory block, and a second coherence participant in the second processing node is configured to issue a probe request regarding a memory region tracked in a memory coherence directory. The first coherence participant is configured to, responsive to receiving the probe request after the memory access request and before receiving a systemwide coherence response for the memory access request, detect an address collision between the probe request and the memory access request and, responsive thereto, transmit a speculative coherence response. The response logic is configured to, responsive to the speculative coherence response, provide a systemwide coherence response for the probe request that prevents the probe request from succeeding.

While various embodiments have been particularly shown as described, it will be understood by those skilled in the art that various changes in form and detail may be made therein without departing from the spirit and scope of the invention. For example, although embodiments have been described in which each processing node includes a single node interface 140, it will be appreciated that in other embodiments more than one node interface can be implemented. As a particular non-limiting example, it should be understood that the structures and functions of a node interface 140 can be distributed and implemented within each of processing units 100. In this regard, node interface 140, whether unified or distributed, is not required to incorporate an I/O controller, which can be separately implemented, whether as a unified or distributed I/O controller.

What is claimed is:

1. A data processing system, comprising:
at least a first processing node and a second processing node coupled by an interconnect fabric including communication links that convey operations between the first and second processing nodes, wherein each of the first and second processing nodes includes at least one processor core and multiple coherence participants including integrated circuitry configured to participate in interconnect operations on the interconnect fabric;
response logic coupled to the interconnect fabric, wherein the response logic includes integrated circuitry that is configured to provide systemwide coherence responses for operations on the interconnect fabric;

wherein the coherence participants in the first processing node include a first coherence participant configured to issue a memory access request specifying a target memory block and the second processing node includes a second coherence participant configured to issue a probe request regarding a memory region tracked in a memory coherence directory;

wherein the first coherence participant is configured to, responsive to receiving the probe request after the memory access request and before receiving a systemwide coherence response for the memory access request, detect an address collision between the probe request and the memory access request and, responsive thereto, transmit a speculative coherence response to the response logic; and wherein the response logic is configured to, responsive to the speculative coherence response, provide on the interconnect fabric a systemwide coherence response for the probe request that prevents the probe request from succeeding.

2. The data processing system of claim 1, wherein the operations on the interconnect fabric complete in a non-deterministic time interval.

3. The data processing system of claim 1, wherein the first coherence participant is configured to transmit the speculative coherence response only in response to probe requests.

4. The data processing system of claim 1, wherein the coherence response is a partial response representing a coherence response of only the first coherence participant.

5. The data processing system of claim 1, wherein the speculative coherence response indicates that the first coherence participant caches a read-only copy of the target memory block.

6. The data processing system of claim 1, wherein the second coherence participant includes a node interface configured to selectively forward operations from the second processing node to the first processing node based on contents of the memory coherence directory.

7. A processing unit for a data processing system including at least a first processing node including the processing unit and a second processing node coupled to the first processing node by an interconnect fabric, the processing unit comprising:
    a processor core;
    a cache hierarchy including a store-in lower level cache, wherein the lower level cache is configured to:
        issue on the interconnect fabric a memory access request specifying a target memory block;
        responsive to receiving a probe request from the second processing node after the memory access request and before receiving a systemwide coherence response for the memory access request, detect an address collision between the probe request and the memory access request; and
        responsive to detecting the address collision, provide a speculative coherence response to the response logic that prevents the probe request from succeeding.

8. The processing unit of claim 7, wherein the operations on the interconnect fabric complete in a non-deterministic time interval.

9. The processing unit of claim 7, wherein the lower level cache is configured to transmit the speculative coherence response only in response to probe requests.

10. The processing unit of claim 7, wherein the coherence response is a partial response representing a coherence response of only the lower level cache.

11. The processing unit of claim 7, wherein the speculative coherence response indicates that the lower level cache holds a read-only copy of the target memory block.

12. A processing node for a multi-node data processing system, comprising:
    a plurality of processing units in accordance with claim 7; and
    a node interface coupled to the second processing node.

13. A method of data processing in a data processing system including at least first and second processing nodes coupled by an interconnect fabric, the method comprising:
    a first coherence participant in the first processing node issuing on the interconnect fabric a memory access request specifying a target memory block;
    responsive to receiving a probe request from a second coherence participant in the second processing node after the memory access request and before receiving a systemwide coherence response for the memory access request, the first coherence participant detecting an address collision between the probe request and the memory access request; and
    in response to detecting the address collision, the first coherence participant providing a speculative coherence response to the response logic that prevents the probe request from succeeding.

14. The method of claim 13, wherein operations on the interconnect fabric complete in a non-deterministic time interval.

15. The method of claim 13, wherein providing the speculative coherence response includes providing the speculative coherence response only in response to probe requests.

16. The method of claim 13, wherein the coherence response is a partial response representing a coherence response of only the first coherence participant.

17. The method of claim 13, wherein the speculative coherence response indicates that the first coherence participant caches a read-only copy of the target memory block.

18. The method of claim 13, wherein:
    the second coherence participant includes a node interface configured to selectively forward operations from the second processing node to the first processing node based on contents of the memory coherence directory; and
    the method further includes the second coherence participant transmitting the probe request on the interconnect fabric in a garbage collection process.

* * * * *